US007501777B2

(12) United States Patent
Yun et al.

(10) Patent No.: US 7,501,777 B2
(45) Date of Patent: Mar. 10, 2009

(54) PRINTER AND METHOD OF DRIVING COOLING FAN OF PRINTER

(75) Inventors: Jin-su Yun, Suwon (KR); Cheol-ju Yang, Daegu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 726 days.

(21) Appl. No.: 10/453,524

(22) Filed: Jun. 4, 2003

(65) Prior Publication Data

US 2004/0000886 A1 Jan. 1, 2004

(30) Foreign Application Priority Data

Jun. 28, 2002 (KR) .............................. 2002-37130

(51) Int. Cl.
*G05B 5/00* (2006.01)
*H02P 1/04* (2006.01)
*H02P 3/00* (2006.01)

(52) U.S. Cl. ....................... 318/471; 388/934; 702/130; 702/132

(58) Field of Classification Search ....................... None
See application file for complete search history.

(56) References Cited

U.S. PATENT DOCUMENTS 4,842,431 A 6/1989 Katsukawa
5,457,766 A * 10/1995 Ko ............................. 388/831
5,526,229 A * 6/1996 Wakabayashi et al. ...... 361/702
6,018,140 A * 1/2000 Hirose et al. ................ 219/216
6,651,026 B2 * 11/2003 Yamauchi et al. ........... 702/132
6,654,894 B2 * 11/2003 Kaminski et al. ........... 713/300
2002/0059533 A1 * 5/2002 Kaminski et al. ........... 713/300
2004/0109288 A1 * 6/2004 Beitelmal et al. ........... 361/687

* cited by examiner

*Primary Examiner*—Marlon T Fletcher
(74) *Attorney, Agent, or Firm*—Staas & Halsey LLP

(57) ABSTRACT

A printer and a method of driving a cooling fan of the printer include a storage unit temporarily stores printing option data and image data, and a control unit controls an operation of a printing unit in one of a warming-up mode, a standby mode, a printing mode and a sleep mode based on the printing option data and the image data as inputted into the control unit. The control unit outputs a control signal variably controlling an RPM (Rotation Per Minute) of the cooling fan based on the operation mode and a printing speed of the printing unit. A cooling fan driving unit drives the cooling fan at a different RPM based on the control signal input from the control unit. Accordingly, the printer and the method of driving the cooling fan of the printer are capable of shortening the warming-up time to increase an initial printing speed, preventing the printing unit from being overheated, extending a lifespan of the cooling fan, and reducing a power consumption.

18 Claims, 5 Drawing Sheets

PRINTER AND METHOD OF DRIVING COOLING FAN OF PRINTER

CROSS-REFERENCE TO RELATED APPLICATIONS

This application claims the benefit of Korean Patent Application No. 2002-37130, filed Jun. 28, 2002, in the Korean Intellectual Property Office, the disclosure of which is incorporated herein by reference.

BACKGROUND OF THE INVENTION

1. Field of the Invention

The present invention relates to a printer, and more particularly, to a printer capable of variably controlling a Revolution Per Minute (RPM) of a cooling-fan depending on an operation mode of a printing unit and a method of driving the cooling fan of the printer.

2. Description of the Related Art

As shown in FIG. 1, a conventional printer employing an electrophotographic developing method includes a pick-up roller 101, a charging roller 103, an organic photoconductive (OPC) drum 105, a transfer roller 107, a developing roller 109, a supplying roller 111, a fusing device 113, and a light exposure device 115, to print a predetermined image data on a sheet of printing paper 117. That is, the charging roller 103 electrically charged with a high charging voltage rotates to electrically and uniformly charge a photosensitive material coated along an external circumference of the organic photoconductive drum 105, and light emitted from the light exposure device 115 forms an electrostatic latent image on a surface of the electrically charged organic photoconductive drum 105. An electric potential difference then occurs between the supplying roller 111 supplied with a supplying voltage, e.g., a higher voltage, and the developing roller 109 supplied with a developing voltage, e.g., a lower voltage, than that of the supplying roller 111, thereby moving a negative charge from the supplying roller 111 to the developing roller 109. Accordingly, toner supplied from the developing roller 109 is coated on the electrostatic latent image formed on the surface of the organic photoconductive drum 105 to thus form a visible image. The transfer roller 107 of a transfer voltage, e.g., another higher voltage, transfers the visible image formed with the toner coated on the surface of the organic photoconductive drum 105 to the printing paper 117. A pre-transfer lamp (PTL) 123 emits light having a predetermined wavelength onto the organic photoconductive drum 105 to decrease an electric potential of the toner coated on the organic photoconductive drum 105. As a result, a binding force of the toner with respect to the organic photoconductive drum 105 decreases to thus improve a transfer efficiency of the toner from the organic photoconductive drum 105 to the printing paper 117. The visible image transferred to the printing paper 117 is settled down on the printing paper 117 due to a high temperature and a high pressure of a heating roller 119 and a compressing roller 121, which are provided in the fusing device 113, and printing work is then finished.

At this point, the supplying voltage, the developing voltage, the transfer voltage, and the charging voltage as described above are kept continuously supplied to the supplying roller 111, the developing roller 109, the transfer roller 107, and the charging roller 103, respectively, until the printing work is finished. Also, the heating roller 119 of the fusing device 113 maintains in a turned-on state and a predetermined temperature until the printing work is finished. A cooling fan

125 generates air current to cool heat that occurs in the printer due to the heating roller 119 and the printing work.

FIG. 2 is a view showing power supply signals to be supplied to the cooling fan 340 corresponding to operation modes of the printer of FIG. 1 and RPMs of the cooling fan 340 corresponding to the power supply signals.

As shown in FIG. 2, the operation modes of the printer are a warming-up mode 201, a standby mode 202, a first printing mode 203, a second printing mode 205, and a sleep mode 207. When the printer is applied with an initial power, in the warming-up mode 201, the heating roller 119 is heated to a predetermined temperature, and the cooling fan 125 is supplied with a power, thereby switching the warming-up mode 201 to the standby mode 202. The standby mode 202 maintains the predetermined temperature of the heating roller 119 at a predetermined degree such that the printing work is performed within a very short period of time (for example, from 0.5 seconds to 3 seconds) from an input of a printing command. In the first printing mode 203, a series of printing operations are performed according to the input of the printing command, maintaining the temperature of the heating roller 119 at another predetermined degree higher than that of the standby mode 202. In the second printing mode 205, the printer performs printing on the printing paper 117 thicker than a general printing paper or printing on a special paper, such as an OHP film. In the second printing mode 205, the printer performs the printing with the temperature of the heating roller 119 being lower than that of the first printing mode 203 and higher than that of the standby mode 202 and with a printing speed being slower than that of the first printing mode 203. In the sleep mode 207, the printer maintains a power saving condition by blocking a power from being applied to the heating roller 119 when the printer does not receive the printing command for a predetermined period of time on the standby mode 202. At this time, the cooling fan 125 is continuously driven or a power to the cooling fan 125 is blocked after another predetermined period of time passes in the sleep mode 207.

Since in the printer employing an electrophotographic developing method as described above, the temperature of the developing roller 119 becomes different (variable) according to each operation mode of the printer, an inner temperature of the printer also varies. However, the cooling fan 125 is always driven at the same RPM regardless of the inner temperature of the printer as shown in FIG. 2, to discharge the heat of the heating roller 125 outwardly even in the early time of the warming-up mode 201. Accordingly, a warming-up time (from $t_0$ to $t_1$) to meet the condition of the standby mode 202 takes a longer time. Also, there occur problems of shortening a lifespan of the cooling fan 125 and an increased power consumption of the printer. Also, since the conventional printer drives the cooling fan 125 at the same RPM regardless of the printing speed on the printing mode, a higher printing speed of the printer causes an inside of the printer to be overheated.

SUMMARY OF THE INVENTION

The present invention has been developed in order to solve the above and/or other problems in the prior art. Accordingly, it is an aspect of the present invention to provide a printer and a method of driving a cooling fan of the printer capable of shortening a warming-up time, preventing a printing unit from being overheated, extending a lifespan of the cooling fan, and reducing a power consumption.

Additional aspects and advantages of the invention will be set forth in part in the description which follows and, in part, will be obvious from the description, or may be learned by practice of the invention.

The foregoing and/or other aspects of the present invention is achieved by providing a printer including a printing unit printing an image on a sheet of paper according to input printing option data and input image data in a printing mode and a cooling fan preventing a temperature increase of the printing unit. The printing includes a control unit controlling the printing unit according to one of operation modes including the printing mode, a warming-up mode, a standby mode, and a sleep mode, and controlling the cooling fan to rotate at one of a plurality of RPMs according to the one of the operation modes of the printing unit.

The control unit controls the printing unit according to a printing speed corresponding to one of a material and a thickness of the paper in the printing mode and controls the cooling fan to rotate the one of the RPMs according to the printing speed of the printing unit.

The printer further includes a storage unit storing the image data and the printing option data corresponding to the printing speed of the printing unit and the rotation speed of the cooling fan. The stored printing option data represents a material and a thickness of the paper to be printed when the printing unit is controlled to operate in the printing mode.

The controlling unit includes a central processing device controlling the operation of the printing unit based on the stored printing option data and the image data read from the storage unit, and outputting the duty value of the driving pulse read from the storage unit corresponding to each operation mode and the printing speed of the printing unit, and a pulse width modulation signal generating unit outputting driving pulse signals obtained based on the duty value of the driving pulse output from the central processing device.

The printer further comprises a cooling fan driving unit driving the cooling fan in the one of the RPMs in response to the PWM signal.

The control unit controls the operation of the printing unit in the printing mode to print the image on the paper based on the printing option data and the image data, in the standby mode to be ready to start printing the image on the paper in the printing mode within a predetermined period of time after the printing command is input to the printing unit, in the sleep mode to switch the printing mode to a power saving state when there is no reception of the printing command in the standby mode for another predetermined period of time, and in the warming-up mode to be returned to the standby mode while being supplied with a power.

The controlling unit controlling the printing unit to operate in the printing mode variably controls the printing speed of the printing unit based on the stored printing option data and outputs the driving control signal to control the RPM of the cooling fan to be in proportion to the printing speed.

The controlling unit controlling the printing unit to operate in the standby mode and outputs the driving control signal to control the RPM of the cooling fan to maintain a predetermined speed slower than that of the printing mode.

The controlling unit controlling the printing unit to operate in the sleep mode and outputs the driving control signal to control the RPM of the cooling fan to gradually decrease from that of the standby mode.

The controlling unit controlling the printing unit to operate in the warming-up mode and outputs the driving control signal to control the RPM of the cooling fan to gradually increase to a predetermined speed.

The above and/or other aspects of the present invention are achieved by providing a method of driving a cooling fan of a printer generating a print command to control a printing unit to print an image on a sheet of paper and a cooling fan preventing a temperature increase of the printing unit. The method includes controlling the printing unit in one of a printing mode to print the image on the paper, a standby mode to be ready to start printing within a predetermined period of time after the printing commend is input to the printing unit, a sleep mode to switch from the printing mode to a power saving mode when there is no reception of the printing command in the standby mode for another predetermined period of time, and a warming-up mode to return to the standby mode while the printing unit is supplied with a power. The method includes variably controlling an RPM of the cooling fan based on the respective operation modes of the printing unit.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
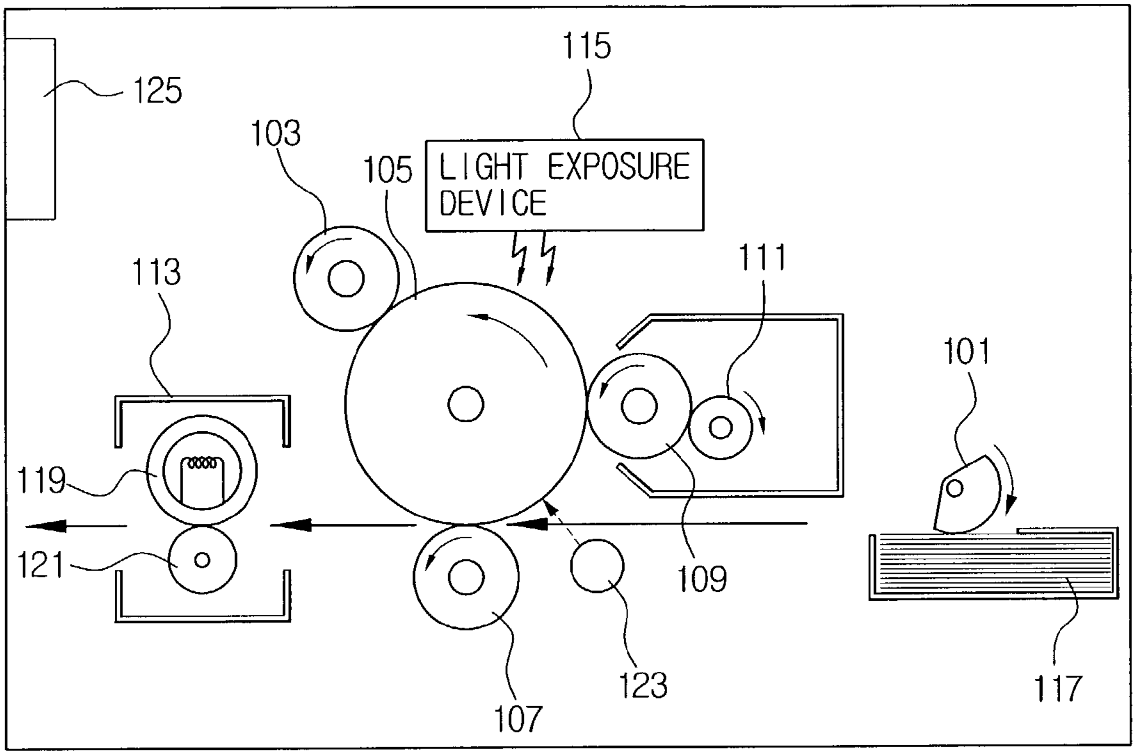
FIG. 1 (PRIOR ART)
FIG. 1 is a schematic view showing an inner structure of a conventional printer employing an electrophotographic developing method.
Figure 2:
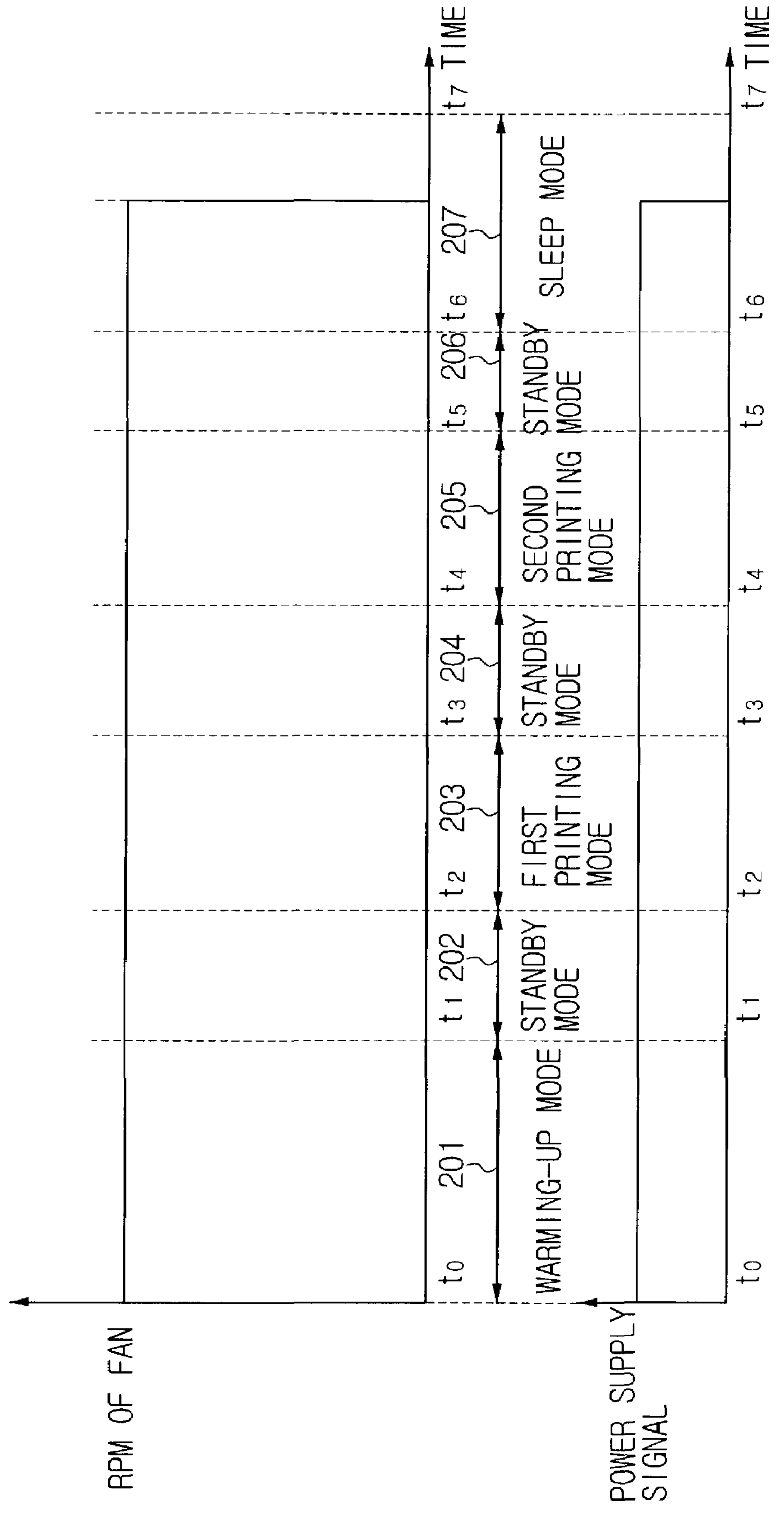
FIG.2 (PRIOR ART)
FIG. 2 is a view showing power supply signals being supplied to a cooling fan corresponding to an operation modes of the printer of FIG. 1 and RPMs of the cooling fan corresponding to the power supply signals.

Reference will now be made in detail to the present preferred embodiments of the present invention, examples of which are illustrated in the accompanying drawings, wherein like reference numerals refer to the like elements throughout. The embodiments are described in order to explain the present invention by referring to the figures. Hereinafter, a preferred embodiment of the present invention will be described in greater detail with reference to the accompanying drawings.

Figure 3:
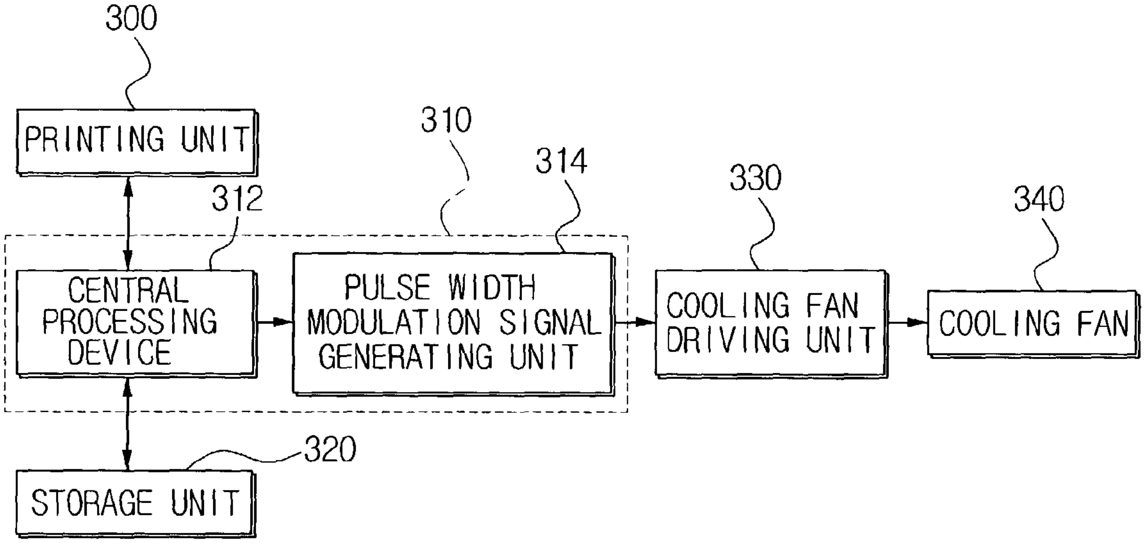
FIG. 3 is a block diagram schematically showing a printer according to an embodiment of the present invention.

FIG. 3 is a block diagram showing a printer according to an embodiment of the present invention. As shown in FIG. 3, the printer includes a printing unit 300, a central processing device 312, a pulse width modulation signal generating unit 314, a storage unit 320, a cooling fan driving unit 330, and a cooling fan 340.

The storage unit 320 stores a driving pulse duty value which is data for controlling an RPM (revolution per minute or rotation per minute) of the cooling fan 340 and corresponds to each operation mode of the printing unit 300. Also, the storage unit 320 temporarily stores image data and printing option data relating to a material and a thickness of printing paper.

The central processing device 312 outputs the printing option data and the image data input from an external computer application program to the storage unit 320 and temporarily stores the printing option data and the image data in the storage unit 320. Based on the printing option data and the image data, the central processing device 312 controls an image forming operation of the printing unit 300. That is, when the printing option data is about a general paper, the central processing device 312 controls a printing speed of the printing unit 300 at a high degree (speed), and when the printing option data is about a special paper, such as an OHP film, the central processing device 312 controls the printing speed of the printing unit 300 at a low degree (speed). Also, the central processing device 312 reads the driving pulse duty value corresponding to the printing speed and the operation mode of the printing unit 300 from the storage unit 320 and outputs the driving pulse duty value to the pulse width modulation signal generating unit 314.

The printing unit 300 is controlled to be on a warming-up mode, a standby mode, a printing mode, and a sleep mode based on a control signal input from the central processing device 312. When the printing unit 300 is controlled to be in the printing mode; the printing unit 300 performs a printing operation with the printing speed, which is variable according to the material and the thickness of the printing paper based on a control signal of the central processing device 312.

The pulse width modulation signal generating unit 314 outputs a driving pulse signal that is obtained based on the driving pulse duty values input from the central processing unit 312 to the cooling fan driving unit 330. The driving pulse duty value is a ratio of an 'on' time to one cycle of a pulse.

The cooling fan driving unit 330 supplies and blocks a power to and from the cooling fan 340 according to a cycle of the driving pulse signal input from the pulse width modulation signal generating unit 314, thereby varying the RPM of the cooling fan 340.

The cooling fan 340 rotates with the RPM variable based on the driving pulse signal input from the cooling fan driving unit 330.

Hereinafter, the descriptions will be made about the driving pulse signal (PWM signal) output from a control unit 310 with respect to each of the warming-up mode, the standby mode, the printing mode, and the sleep mode, and the RPM of the cooling fan 340 corresponding to the driving pulse signal when the control unit 310 controls the printing unit 300 in any one mode among the above-described operations modes.

Figure 4:
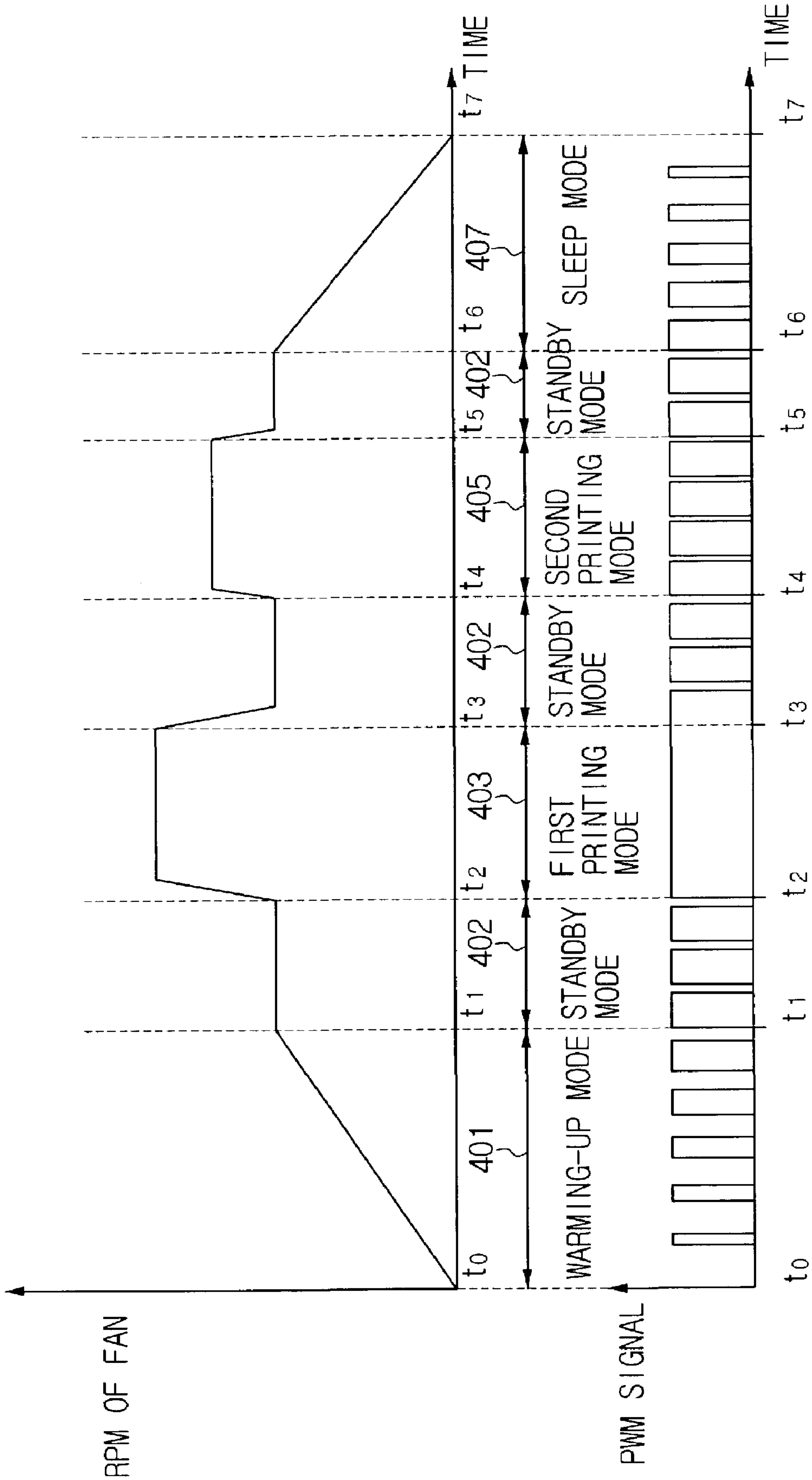
FIG. 4 is a flow chart showing driving pulse signals being supplied to a cooling fan driving unit corresponding to operation modes of a printing unit of the printer of FIG. 3 and RPMs of the cooling fan corresponding to the driving pulse signal.

FIG. 4 is a view showing the driving pulse signal supplied to the cooling fan diving unit 330 corresponding to each operation mode of the printing unit 300 of FIG. 3 and the RPM of the cooling fan 340 corresponding to the diving pulse signal.

At a point $t_0$ when the printer is initially supplied with the power, and at a point when the printing command is input to the control unit 310 in the sleep mode 407, the control unit 310 controls the printing unit 300 in the warming-up mode 401. Operation modes of the printing unit 300 are represented by intervals between adjacent points $t_1$ through $t_7$. As shown in FIG. 4, the control unit 310 generates the driving pulse signal with a duty value gradually increasing from 0% to 80% during the interval of the warming-up mode 401 based on the duty value read from the storage unit 320 and corresponding to the warming-up mode 401. Corresponding to the driving pulse signal, the RPM of the cooling fan 340 gradually increases to a predetermined speed during the interval of the warming-up mode 401. Accordingly, a heating part of the printing unit 300 is easily heated in the warming-up mode 401 and thus, the interval of the warming-up mode 401 is shortened.

In the standby mode 402, the printer maintains the heating part of the printing unit 300 at a predetermined temperature, so that the printing unit 300 can start to perform printing within a predetermined short period of time (for example, from 0.5 seconds to 5 seconds) after the printing command is supplied to the printing unit 300. When the control unit 310 controls the printing unit 300 in the standby mode 402, the control unit 310 generates the driving pulse signal with the duty value of 80% during the interval of the standby mode 402 based on the duty value read from the storage unit 320 corresponding to the standby mode 402, and the cooling fan 340 maintains a predetermined RPM corresponding to the driving pulse signal.

When the printing command is input to the control unit 310 in the standby mode 402, the control unit 310 determines the printing speed based on the input printing option data and controls the printing unit 300 on a first printing mode 403, i.e., a high-speed printing mode, and a second printing mode 405, i.e., a low-speed printing mode. When the control unit 310 controls the printing unit 300 in the first printing mode 403, the control unit 310 generates the driving pulse signal with the duty value of 100% during the interval of the first printing mode 403 based on the duty value read from the storage unit 320 corresponding to the high speed printing mode. Also, when the control unit 310 controls the printing unit 300 in the second printing mode 405, the control unit 310 generates the driving pulse signal with the duty value of 90% during the interval of the second printing mode 405 based on the duty value read from the storage unit 320 corresponding to the low-speed printing mode. When the printing operation of the printing unit 300 is completed, the control unit 310 controls the printing unit 300 in the standby mode 402. At this point, if the printing command is not input for a predetermined time, the control unit 310 controls the printing unit 300 in the sleep mode 407.

When the control unit 310 controls the printing mode 300 in the sleep mode 407, the control unit 310 generates the driving pulse signal with the duty value gradually decreasing from 80% to 0% during the interval of the sleep mode 407 based on the duty value read from the storage unit 320 corresponding to the sleep mode 407. Corresponding to the driving pulse signal, the RPM of the cooling fan 340 decreases gradually to a predetermined speed for the interval of the sleep mode 407.

The following table 1 shows driving pulse duty values corresponding to the respective operation modes of the printing unit 300 and stored in the storage unit 320.

TABLE 1

| Operation Modes | Driving Pulse Duty Values |
|---|---|
| Warming-up mode | Gradually increasing to 80% |
| Standby mode | 80% |
| High-speed printing mode (first printing mode) | 100% |
| Low-speed printing mode (second printing mode) | 90% |
| Sleep mode | Gradually decreasing from 80% |

According to another aspect of the present invention, the control unit 310 determines the driving pulse duty values without reading the driving pulse duty values signals from the storage unit 320.

Hereinafter, a method of driving the cooling fan 340 of the printer according to the present invention will be described with reference to FIG. 5.

Figure 5:
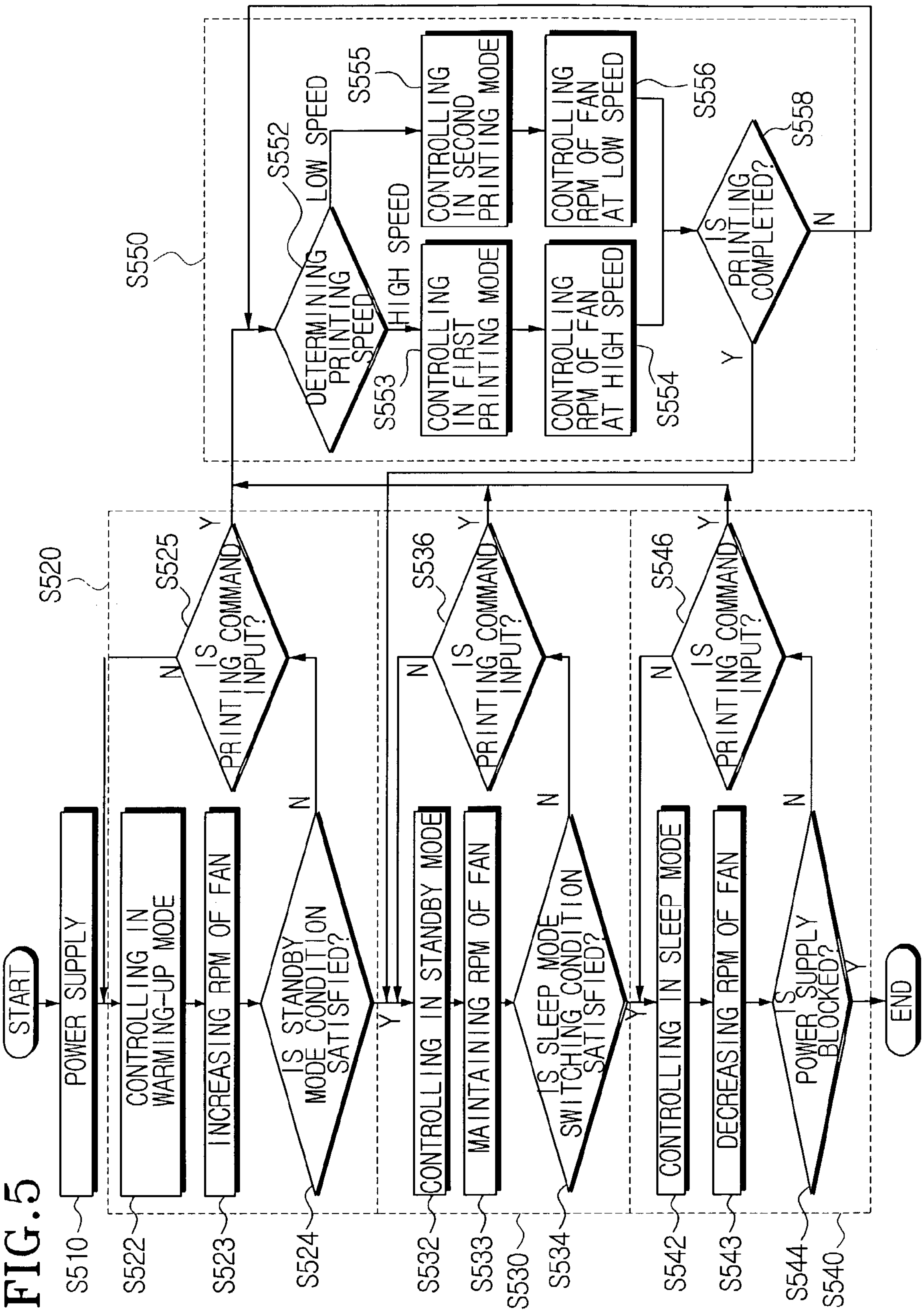
FIG. 5 is a flowchart showing an operation performed in the printer shown in FIG. 3.

FIG. 5 is a flowchart showing the operation of the printer according to the present invention. When the printer is supplied with the power in operation S510, the control unit 310 controls the printing unit 300 in one of the warming-up mode in operation S520, the standby mode in operation S530, the sleep mode in operation S540, and the printing mode in operation S550. The operation according to each operation mode is described as follows.

When the control unit 310 controls the printing unit 300 in the warming-up mode 401 in operation S522, the control unit 310 controls the RPM of the cooling fan 340 to gradually increase to the predetermined speed (for example to 800 rpm) in operation S523 and switches the printing unit 300 to the standby mode 402. If the printing unit 300 satisfies the condition of the standby mode 402 in operation S524, the control unit 310 controls the printing unit 300 in the standby mode 402 in operation S520. Also, if the printing unit 300 does not satisfy the condition of the standby mode 402, the controls unit 310 determines whether the printing command is input to the control unit 310 in operation S525. If the printing command is not input, the control unit 310 returns to the operation S522, and if the printing command is input, the control unit 310 controls the printing unit 300 in the first or second printing mode 403 or 405 in operation S550.

When the control unit 310 controls the printing unit 300 in the standby mode 402 in operation S532, the control unit 310 controls the RPM of the cooling fan 340 to maintain the predetermined speed (for example, 800 rpm) in operation S533. The control unit 310 determines whether a sleep mode switching condition (that is, whether the printing command is not input for the predetermined period of time) is satisfied in operation S534. If the sleep mode switching condition is satisfied, the control unit 310 controls the printing unit 300 in the sleep mode 407 in operation S540. If the sleep mode switching condition is not satisfied, the control unit 310 determines whether the printing command is input to the control unit 310 in operation S536. If the printing command is not input, the control unit 310 returns to operation S532, and if the printing command is input, the control unit 310 controls the printing unit 300 in the first or second printing mode 403 or 405 in operation S550.

When the control unit 310 controls the printing unit 300 in the sleep mode 407 in operation S542, the control unit 310 controls the RPM of the cooling fan 340 to gradually decrease from the predetermined speed (for example from 800 rpm) in operation S543. When the power is blocked from being supplied to the printer in operation S544, all of the operations are completed. Also, the control unit 310 determines whether the printing command is input to the control unit 310 in operation S546. If the printing command is not input, the control unit returns to operation S542, and if the printing command is input, the control unit 310 controls the printing unit 300 in the first or second printing mode 403 or 405 in operation S550.

When the control unit 310 controls the printing unit 300 in the first or second printing mode 403 or 405 in operation S550, the control unit 310 determines the printing speed based on the input printing option data in operation S552 to variably control the printing speed of the printing unit 300. When the control unit 310 controls the printing unit 300 in the high-speed printing mode, i.e., in the first printing mode 403, in operation S553, the control unit 310 controls the RPM of the cooling fan 340 at a highest speed (for example, 1000 rpm) (S554). Also, when the control unit 310 controls the printing unit 300 in the low-speed printing mode, i.e., in the second printing mode 405, in operation S555, the control unit 310 controls the RPM of the cooling fan 340 to maintain the predetermined speed (for example 900 rpm) that is higher than the speed of the standby mode 402 (for example, 800 rpm) and lower than the speed of the first printing mode 403 in operation S556. Also, the control unit 310 determines whether the printing is completed in operation S558. If the printing operation of the printing unit 300 is completed, the control unit 310 returns to the standby mode 402 in operation S530, and if the printing operation is not completed, the control unit 310 repeats operation S552.

Although the control unit 310 controls the pulse width modulation signal generating unit 314 to generate the driving pulse signal by reading the driving pulse duty value from the storage unit 320, this should not be considered as limiting. That is, the control unit 310 can directly determine the driving pulse duty value corresponding to the each operation mode of the printing unit 300, and also can directly generate the driving pulse signal. Also, the control unit 310 can make nonlinear changes of the duty value by time, and a driving logic of the cooling fan 340 can be updated without a mechanical change.

According to the printer and the method of driving the cooling fan of the printer of the present invention, the warming-up time is shortened and thus, an initial printing speed is increased. Also, the printing unit can be prevented from being overheated, a lifespan of the cooling fan can be extended, and a power consumption can be reduced.

While the invention has been shown and described with reference to certain preferred embodiments thereof, it will be understood by those skilled in the art that various changes in form and details may be made therein without departing from the spirit and scope of the invention as defined by the appended claims and their equivalents.

The invention claimed is:

1. A printer comprising:

a printing unit printing an image on a sheet of paper according to input printing option data and input image data in a printing mode;

a cooling fan preventing a temperature increase of the printing unit; and a control unit controlling the printing unit according to one of operation modes including the printing mode, a warming-up mode, a standby mode, and a sleep mode, and controlling the cooling fan to rotate at a predetermined RPMs (Revolution Per Minute) according to the one of the operation modes of the printing unit, wherein the RPM varies for each change in mode.

2. The printer of claim 1, wherein the control unit controls the printing unit according to a printing speed corresponding to one of a material and a thickness of the paper in the printing mode and controls the cooling fan to rotate the one of the RPMs according to the printing speed of the printing unit.

3. The printer of claim 2, further comprising:

a storage unit storing the image data and the printing option data corresponding to the printing speed of the printing unit and the rotation speed of the cooling fan, wherein the stored printing option data represents a material and a thickness of the paper to be printed when the printing unit is controlled to operate in the printing mode.

4. The printer of claim 3, wherein the printing option data and the image data stored in the storage unit are deletable and re-writable.

5. The printer of claim 3, wherein the storage unit stores a duty value of a driving pulse of a predetermined cycle corresponding to each operation mode of the printing unit.

6. The printer of claim 5, wherein the controlling unit comprises:

a central processing device controlling the operation of the printing unit based on the stored printing option data and the image data read from the storage unit, and outputting the duty value of the driving pulse read from the storage unit corresponding to each operation mode and the printing speed of the printing unit; and a pulse width modulation signal generating unit outputting driving pulse signals obtained based on the duty value of the driving pulse output from the central processing device.

7. The printer of claim 6, further comprising:

a cooling fan driving unit driving the cooling fan in the one of the RPMs in response to the PWM signal.

8. The printer of claim 1, wherein the control unit controls the operation of the printing unit in the printing mode to print the image on the paper based on the printing option data and the image data, in the standby mode to be ready to start printing the image on the paper in the printing mode within a predetermined period of time after the printing command is input to the printing unit, in the sleep mode to switch the printing mode to a power saving state when there is no reception of the printing command in the standby mode for another predetermined period of time, and in the warming-up mode to be returned to the standby mode while being supplied with a power.

9. The printer of claim 8, wherein the controlling unit controlling the printing unit to operate in the printing mode variably controls the printing speed of the printing unit based on the stored printing option data and outputs the driving control signal to control the RPM of the cooling fan to be in proportion to the printing speed.

10. The printer of claim 8, wherein the controlling unit controlling the printing unit to operate in the standby mode and outputs the driving control signal to control the RPM of the cooling fan to maintain a predetermined speed slower than that of the printing mode.

11. The printer of claim 8, wherein the controlling unit controlling the printing unit to operate in the sleep mode and outputs the driving control signal to control the RPM of the cooling fan to gradually decrease from that of the standby mode.

12. The printer of claim 8, wherein the controlling unit controlling the printing unit to operate in the warming-up mode and outputs the driving control signal to control the RPM of the cooling fan to gradually increase to a predetermined speed.

13. A method of driving a cooling fan of a printer generating a print command to control a printing unit to print an image on a sheet of paper and a cooling fan preventing a temperature increase of the printing unit, the method comprising:

controlling the printing unit in one of a printing mode to print the image on the paper, a standby mode to be ready to start printing within a predetermined period of time after the printing command is input to the printing unit, a sleep mode to switch from the printing mode to a power saving mode when there is no reception of the printing command in the standby mode for another predetermined period of time, and a warming-up mode to return to the standby mode while the printing unit is supplied with a power; and variably controlling an RPM (Revolution Per Minute) of the cooling fan based on the respective operation modes of the printing unit, wherein the RPM varies based on the each mode.

14. The method of claim 13, wherein the variably controlling of the RPM of the cooling fan comprises:

controlling the RPM of the cooling fan based on a printing speed of the printing unit when the operation mode of the printing unit is the printing mode.

15. The method of claim 14, wherein the variably controlling of the RPM of the cooling fan comprises:

controlling the RPM of the cooling fan so that the RPM of the cooling fan is in proportion to the printing speed of the printing unit.

16. The method of claim 13, wherein the variably controlling of the RPM of the cooling fan comprises:

controlling the RPM of the cooling fan to maintain a predetermined speed when the operation mode of the printing unit is the standby mode.

17. The method of claim 13, wherein the variably controlling of the RPM of the cooling fan comprises:

controlling the RPM of the cooling fan to be gradually decreased from that of the standby mode when the operation mode of the printing unit is the sleep mode.

18. The printer of claim 13, wherein the variably controlling of the RPM of the cooling fan comprises:

controlling the RPM of the cooling fan to be gradually increased to that of the standby mode when the operation mode of the printing unit is the warming up mode.

* * * * *

UNITED STATES PATENT AND TRADEMARK OFFICE

CERTIFICATE OF CORRECTION

PATENT NO. : 7,501,777 B2
APPLICATION NO. : 10/453524
DATED : March 10, 2009
INVENTOR(S) : Jin-su Yun et al.

It is certified that error appears in the above-identified patent and that said Letters Patent is hereby corrected as shown below:

Column 8, Line 44, change “RPMs” to --RPM--.

Signed and Sealed this

Twenty-first Day of July, 2009

JOHN DOLL
*Acting Director of the United States Patent and Trademark Office*